United States Patent
Brown et al.

[11] Patent Number: 6,055,963
[45] Date of Patent: May 2, 2000

[54] METHOD FOR DETERMINING THE ENERGY CONTENT OF A FUEL DELIVERED TO AN ENGINE

[75] Inventors: Scott C. Brown, Peoria, Ill.; Martin L. Willi, Lafayette, Ind.

[73] Assignee: Caterpillar Inc., Peoria, Ill.

[21] Appl. No.: 09/036,111

[22] Filed: Mar. 6, 1998

[51] Int. Cl.⁷ .............................. F02M 21/02; F02D 41/00
[52] U.S. Cl. ............................................ 123/525; 123/672
[58] Field of Search ..................................... 123/525, 527, 123/575, 672, 695, 1 A, 703, 27 GE

[56] References Cited

U.S. PATENT DOCUMENTS

| | | | |
|---|---|---|---|
| 4,597,364 | 7/1986 | Young | 123/27 GE |
| 4,641,625 | 2/1987 | Smith | 123/575 |
| 4,884,530 | 12/1989 | Boekhaus | 123/575 |
| 4,955,326 | 9/1990 | Helmich | 123/27 GE |
| 4,986,241 | 1/1991 | Inoue et al. | 123/479 |
| 5,092,305 | 3/1992 | King | 123/27 GE |
| 5,117,802 | 6/1992 | Durbin | 123/27 GE |
| 5,136,986 | 8/1992 | Jensen | 123/27 GE |
| 5,140,959 | 8/1992 | Durbin | 123/304 |
| 5,150,685 | 9/1992 | Porter et al. | 123/478 |
| 5,197,450 | 3/1993 | Kitajima et al. | 123/685 |
| 5,224,457 | 7/1993 | Arsenault et al. | 123/526 |
| 5,226,396 | 7/1993 | Bailey | 123/494 |
| 5,253,631 | 10/1993 | Curran | 123/1 A |
| 5,379,740 | 1/1995 | Moore et al. | 123/27 GE |
| 5,398,724 | 3/1995 | Vars et al. | 137/625.33 |
| 5,450,829 | 9/1995 | Beck | 123/435 |
| 5,526,786 | 6/1996 | Beck et al. | 123/357 |
| 5,533,492 | 7/1996 | Willey | 123/527 |
| 5,582,157 | 12/1996 | Uchikawa | 123/676 |
| 5,628,294 | 5/1997 | Krieckaert et al. | 123/525 |
| 5,668,310 | 9/1997 | Parkman et al. | 123/525 |
| 5,699,767 | 12/1997 | Notsu et al. | 123/27 GE |
| 5,755,211 | 5/1998 | Koch | 123/525 |
| 5,806,490 | 9/1998 | Nogi et al. | 123/679 |
| 5,850,824 | 12/1998 | Seitz et al. | 123/1 A |

*Primary Examiner*—Thomas N. Moulis

[57] ABSTRACT

A method for adjusting a fuel control system of an internal combustion engine to account for variations in the energy content of a fuel delivered to the engine involves monitoring the $O_2$ level of the engine exhaust gases. The fuel may be a gaseous fuel for example. The fuel control system utilizes a stored gaseous fuel energy content value ($E_G$) to determine the necessary duration of a gaseous fuel admission valve control signal. The method includes sensing an actual engine exhaust gas $O_2$ level and comparing the actual exhaust gas $O_2$ level with a desired exhaust gas $O_2$ level. The stored gaseous fuel energy content value ($E_G$) is adjusted based upon the comparison. The desired exhaust gas $O_2$ level may be determined as a function of one or more engine operating parameters which indicate a desired or expected air/fuel ratio, the level of $O_2$ in the exhaust gases being an indicator of the air/fuel ratio.

11 Claims, 3 Drawing Sheets

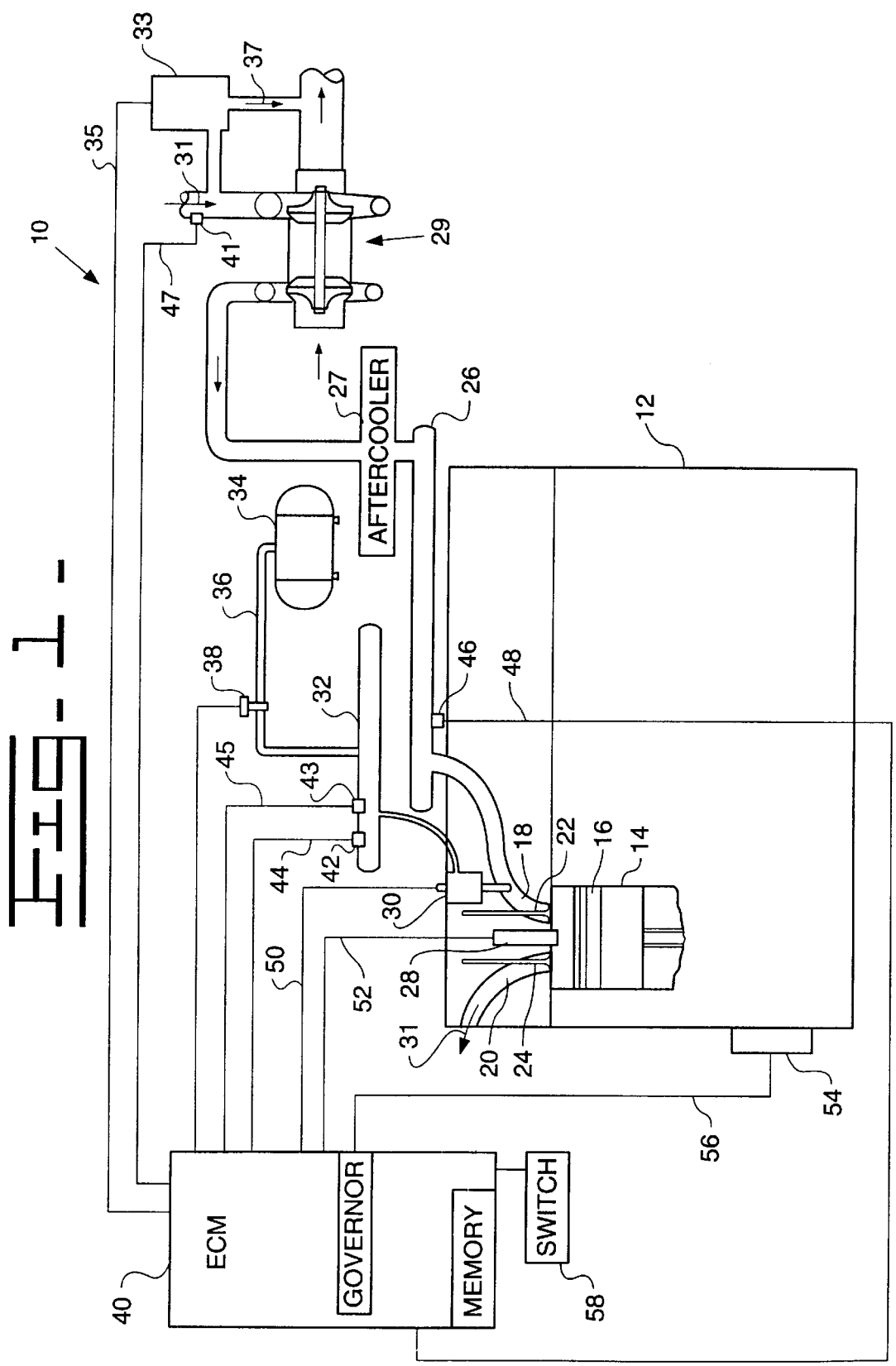

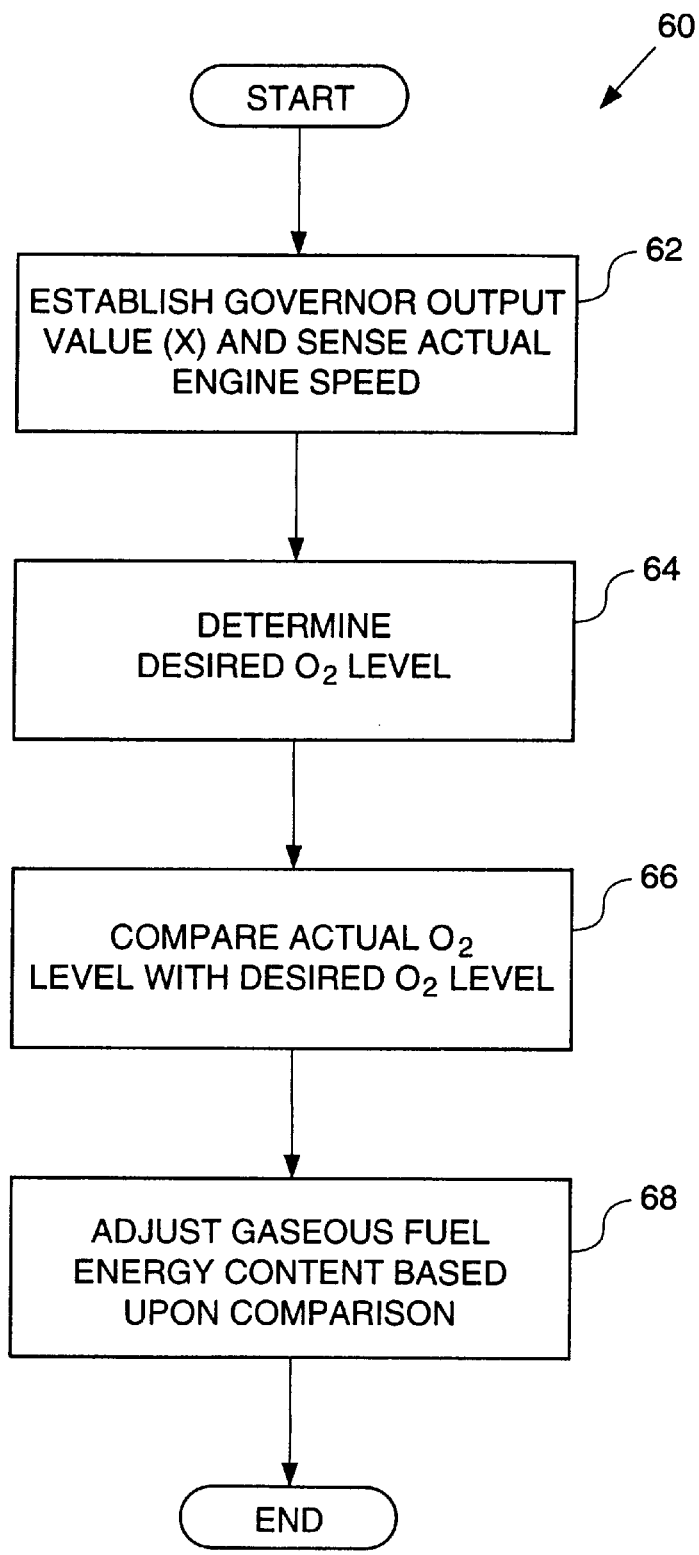
Fig_2_

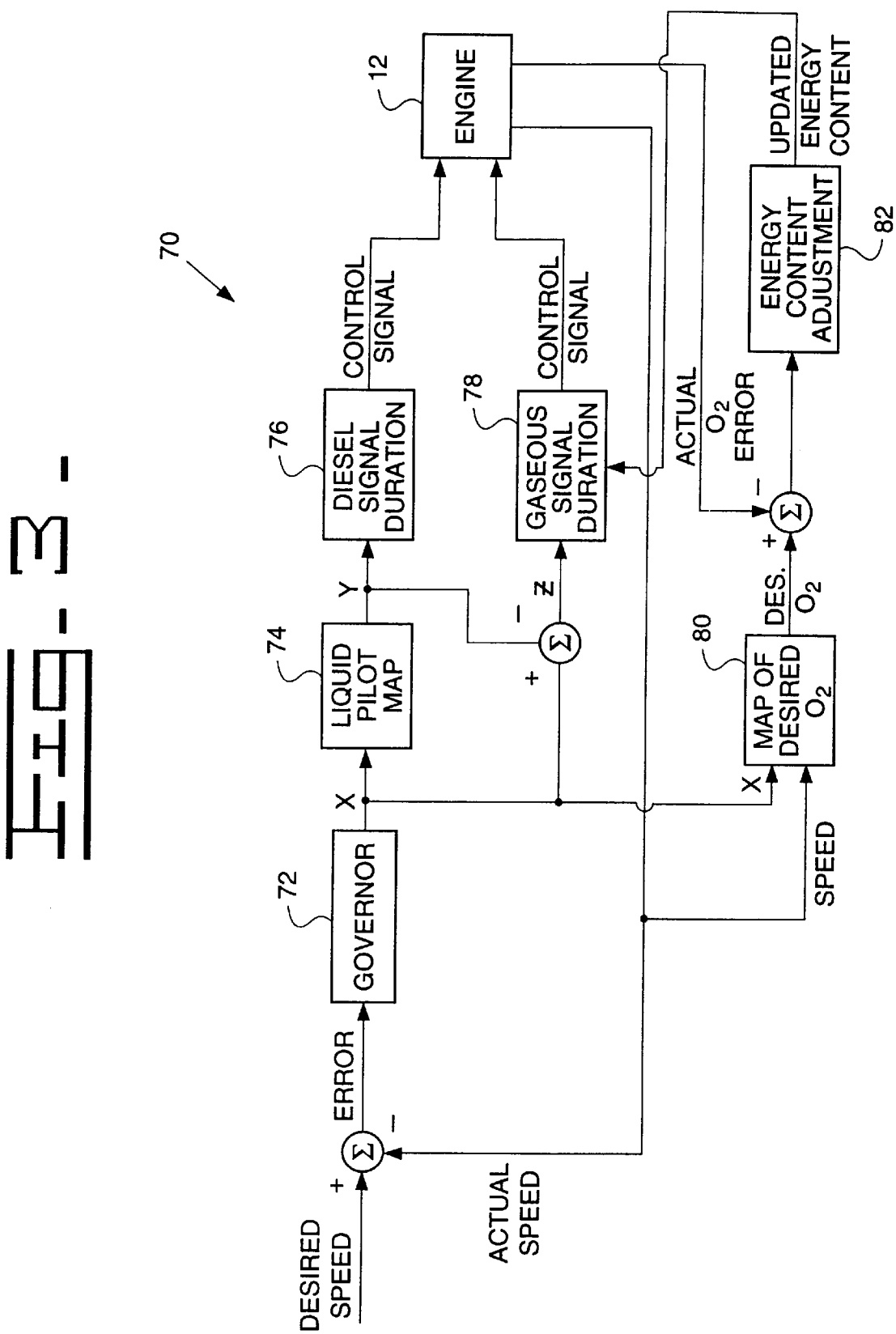

METHOD FOR DETERMINING THE ENERGY CONTENT OF A FUEL DELIVERED TO AN ENGINE

TECHNICAL FIELD

This invention relates generally to internal combustion engines which utilize a fuel of the type having a varying energy content, and more particularly, to a method for accounting for energy content variations of a gaseous fuel delivered to an internal combustion engine based upon the $O_2$ level within the engine exhaust gases.

BACKGROUND ART

Although the description contained herein is directed mainly to dual fuel engines it is recognized that the described methods are applicable to other types of engines which burn a fuel having a varying energy content.

A dual fuel engine can typically operate in two modes. In a strictly liquid fuel mode a liquid fuel, such as diesel fuel, is injected directly into an engine cylinder or a precombustion chamber as the sole source of energy during combustion. In a dual fuel mode a gaseous fuel, such as natural gas, is mixed with air in an intake port of a cylinder and a small amount or pilot amount of diesel fuel is injected into the cylinder or the precombustion chamber in order to ignite the mixture of air and gaseous fuel.

A liquid fuel such as diesel fuel has a substantially constant energy content. However, the energy content of a gaseous fuel such as natural gas can vary. It is desirable that a dual fuel engine fuel control system which utilizes gaseous fuel energy content to determine the amount of gaseous fuel to deliver to the engine should be able to account for variations in the actual gaseous fuel energy content. Similarly, in a spark-ignited engine utilizing a gaseous fuel such as natural gas it may be desirable to know the actual energy content of the gaseous fuel.

Accordingly, the present invention is directed to overcoming one or more of the problems as set forth above.

DISCLOSURE OF THE INVENTION

In one aspect of the present invention a method for adjusting a fuel control system of an internal combustion engine to account for variations in the energy content of a fuel delivered to the engine is provided. The fuel control system utilizes a stored fuel energy content value ($E_G$) to determine the necessary duration of a fuel admission valve control signal. The method includes sensing an actual engine exhaust gas $O_2$ level and comparing the actual exhaust gas $O_2$ level with a desired exhaust gas $O_2$ level. The stored fuel energy content value ($E_G$) is adjusted based upon the comparison. The desired exhaust gas $O_2$ level may be determined as a function of one or more engine operating parameters which indicate a desired or expected air/fuel ratio, the level of $O_2$ in the exhaust gases being an indicator of the air/fuel ratio.

BRIEF DESCRIPTION OF THE DRAWINGS

For a better understanding of the present invention, reference may be made to the accompanying drawings in which:

FIG. 1 is a schematic view of a dual fuel engine system in accordance with the present invention;

FIG. 2 is a flowchart of operating steps for the dual fuel engine of FIG. 1 in accordance with the present invention; and FIG. 3 is a control diagram according to the resent invention.

BEST MODE FOR CARRYING OUT THE INVENTION

Referring to the drawings, numeral 10 in FIG. 1 depicts a dual fuel engine system including an engine 12 with a representative cylinder 14 shown. Although only one cylinder 14 is shown, it is recognized that number of cylinders of engine 12 could vary and that engine 12 could be of the in-line type, v-type, or even a rotary type engine. Piston 16 is positioned for displacement within cylinder 14, which cylinder 14 includes an intake port 18 and an exhaust port 20 including respective valves 22 and 24. Intake port 18 receives air from an air intake manifold 26 to which intake air travels after passing through aftercooler 27, turbocharger 29, and an air filter (not shown).

Engine 12 includes a fuel injector 28, such as an electronic unit injector, positioned for injecting liquid fuel, such as diesel fuel, into cylinder 14. The liquid fuel may be provided to fuel injector 28 by means commonly known in the art. A gaseous fuel admission valve 30 is positioned between a gaseous fuel manifold 32 at an upstream side and intake port 18 at a downstream side, a nozzle portion of valve 30 extending into intake port 18 for delivering gaseous fuel thereto. Gaseous fuel admission valve 30 may, for example, be of the type shown and described in U.S. Pat. No. 5,398,724 available from Woodward Governor Company. Gaseous fuel manifold 32 is connected to a source of gaseous fuel 34 by fuel path 36, a solenoid operated gaseous fuel shut off valve 38 being positioned along fuel path 36. Although not shown, it is recognized that such a system might typically include a balance regulator positioned between gaseous fuel source 34 and gaseous fuel manifold 32 for regulating the gaseous fuel pressure at the upstream side of gaseous fuel admission valve 30.

An electronic control module (ECM) 40 is connected to a gaseous fuel pressure sensor 42 via conductive path 44 and to an intake air pressure sensor 46 via conductive path 48 for receiving pressure indicative signals from each of such sensors. Such pressure sensors are well known in the art and therefore a detailed description of the sensors is not included herein. A temperature sensor 43 is also provided in gaseous fuel manifold 32 to provide temperature indicative signals to ECM 40 via conductive path 45. ECM 40 is connected for controlling gaseous fuel admission valve 30 by conductive path 50 and is also connected for controlling fuel injector 28 by conductive path 52. In this regard it is know to include driver circuitry within ECM 40 for delivering current control signals to such devices. However, it is recognized that such driver circuitry could be formed separate from, but connected to, ECM 40. An engine speed sensor 54 associated with a camshaft of engine 12 is also connected to ECM 40 via conductive path 56 for delivering engine speed indicative signals thereto. ECM 40 typically includes processing means, such as a microcontroller or microprocessor, associated electronic circuitry such as input/output circuitry, as well as associated memory.

Exhaust gases from exhaust port 20 are directed to turbocharger 29 as indicated by arrows 31. An electrically controllable wastegate control valve 33 is provided to control the amount of exhaust gas which bypasses turbocharger 29. ECM 40 is connected for controlling wastegate control valve 33 via conductive path 35. An $O_2$ sensor 41, commonly referred to as an EGO sensor, is provided along the exhaust gas path for sensing the $O_2$ level and delivering $O_2$ level indicative signals to ECM 40 via conductive path 47. A single $O_2$ sensor positioned in an exhaust manifold could be utilized or a separate $O_2$ sensor positioned in the exhaust port of each cylinder could be utilized.

Dual fuel engine system 10 can operate in both a liquid fuel mode and a dual fuel mode. In the liquid fuel mode the liquid fuel is injected into engine cylinder 14 as the sole source of fuel energy during combustion. In a dual fuel mode the gaseous fuel is mixed with air in intake port 18 of cylinder 14 and a small amount or pilot amount of liquid fuel is injected into cylinder 14 in order to ignite the mixture of air and gaseous fuel. The mode of operation may be established by sensed engine parameters in conjunction with an operator input such as provided by a mode switch 58.

The fuel control system of engine 12 operates by establishing a governor output value (X) indicative of a total fuel energy rate desired to be delivered to the engine to maintain a desired engine speed. The desired engine speed may be a predetermined, stored speed or may be indicated by a throttle setting for example. A first value (Y) indicative of a liquid pilot fuel energy rate desired to be delivered to the engine and a second value (Z) indicative of a gaseous fuel energy rate desired to be delivered to the engine are each determined such that the sum of the desired liquid pilot fuel energy rate and the desired gaseous fuel energy rate is substantially equal to the desired total fuel energy rate. A fuel injector control signal duration and a gaseous fuel admission valve control signal duration are both determined such that the liquid fuel delivered to the engine provides the desired liquid pilot fuel energy rate and the gaseous fuel delivered to the engine provides the desired gaseous fuel energy rate. The gaseous fuel admission valve control signal duration is determined utilizing both the gaseous fuel value (Z) and a stored gaseous fuel energy content value ($E_G$). With respect to liquid pilot value (Y) and gaseous fuel value (Z), value (Y) is determined as a function of engine speed and engine load and value (Z) is defined as Z=X−Y.

The governor output value (X) is also utilized to control air flow into cylinder 14 by making adjustments to wastegate control valve 33. In particular, a desired air flow is determined as a function of governor output value (X) and sensed engine speed, and ECM 40 effects delivery of an electrical signal to wastegate control valve 33 in order to control the turbocharger bypass airflow 37. The intake airflow 39 will vary as the bypass airflow 37 varies. In general, the desired air flow to the cylinders will increase as governor output value (X) increases because a larger value (X) indicates more fuel delivery to the engine.

Referring now to FIG. 2, a flowchart 60 of operating steps in accordance with the present invention in the dual fuel mode is shown. In particular, a governor output value (X) is established in the dual fuel mode, and the actual engine speed is also determined at step 62. The desired exhaust gas $O_2$ level is determined at step 64, such as from a 3-D map of exhaust gas $O_2$ level as a function of governor output value (X) and the sensed engine speed. The actual exhaust gas $O_2$ level, as sensed from $O_2$ sensor 41, is compared with the desired exhaust gas $O_2$ level at step 66. At step 68 the stored gaseous fuel energy content value ($E_G$) is adjusted based upon the comparison. In particular, if the actual exhaust gas $O_2$ level is greater than the desired exhaust gas $O_2$ level the stored gaseous fuel energy content value ($E_G$) will be adjusted downward and if the actual exhaust gas $O_2$ level is less than the desired exhaust gas $O_2$ level the stored gaseous fuel energy content value ($E_G$) will be adjusted upward. A higher than desired exhaust gas $O_2$ level is indicative of a leaner than expected air/fuel ratio meaning that too much air is being delivered to the engine cylinders. Because the amount of air delivered increases as governor output value (X) increases, a lean air/fuel ratio is indicative of the governor output value (X) being too high and thus the stored energy content value ($E_G$) also being too high. Likewise, a lower than desired exhaust gas $O_2$ level is indicative of a richer than expected air/fuel ratio meaning not enough air is being delivered to the engine cylinders. A rich air/fuel ratio is indicative of the governor output value (X) being too low and thus the stored energy content value ($E_G$) being too low.

Industrial Applicability

The present invention allows variations in the energy content of a gaseous fuel being delivered to the engine to be taken into consideration enabling the air/fuel ratio to be maintained at a desired level.

An example of operation in accordance with the present invention is explained with reference to FIG. 3 which is a control diagram 70. As shown, the actual engine speed as sensed from engine 12 is compared with the desired engine speed and governor 72, which could be a PID controller, utilizes the error to establish output value (X) which is indicative of total fuel energy rate. Liquid pilot fuel map 74 is then utilized to determine liquid pilot fuel rate value (Y). By subtracting liquid pilot value (Y) from value (X) the gaseous fuel value (Z) is determined. The necessary duration of a fuel injector control signal corresponding to liquid pilot value (Y) is determined as a function of rack and engine speed at 76, such as through use of three dimensional map or by making a calculation. A gaseous fuel admission valve control signal duration corresponding to gaseous fuel value (Z) is determined at 78 by an appropriate calculation which takes into account the gaseous fuel pressure, the intake air pressure, the gaseous fuel temperature, the stored gaseous fuel energy content value ($E_G$), and the known flow characteristics of gaseous fuel admission valve 30 in accordance with the following equation:

$$\text{GASDURATION}_Z = [(Z^* K_1^* E_L)/(N_I^* S^* E_G^* F_G)] + t_c,$$

where Z (mm) is a rack value, $K_1$ (g/mm*min) is a predetermined constant for converting rack to a liquid fuel flow rate, $E_L$ (J/g) is the energy content of the liquid fuel, $N_I$ (inj/rev) is the number of injections per engine revolution, S (rev/min) is the engine speed, $E_G$ (J/g) is the stored gaseous fuel energy content, $F_G$ (g/sec) is the flow rate of the gaseous fuel admission valve, and $t_c$ (sec) is an offset to account for mechanical delays and reduced flow for gaseous fuel admission valve 30 during valve opening and closing. Once the control signal durations are determined ECM 40 effects delivery of each control signal to the fuel injector and gaseous fuel admission valve respectively.

The governor output value (X) and sensed engine speed are utilized to determine the desired exhaust gas $O_2$ level at 80. The map of desired exhaust gas $O_2$ level as a function of engine speed and governor output value (X) could be established by engine testing. The desired exhaust gas $O_2$ level is compared with the actual exhaust gas $O_2$ level as sensed from engine 12 and an error or difference is produced and the appropriate energy content adjustment is determined at 82. One technique for making the energy content adjustment at 82 would involve comparing the error or difference to a threshold difference. If the absolute value of the difference is greater than the threshold difference then the stored energy content value ($E_G$) could be increased/ decreased a predetermined amount. In such case steps 66 and 68 of FIG. 2 could be repeated until the appropriate stored gaseous fuel energy content value is obtained. Another technique for making the energy content adjustment at 82 would involve feeding the error to some type of controller, such as an algorithmic or PID controller, which determines the appropriate energy content adjustment as a function of the error or difference and produces and updated energy content value ($E_G'$). The stored gaseous fuel energy content value ($E_G$) could then be replaced with the updated value ($E_G'$).

The method according to the present invention could also be incorporated into a spark-ignited engine which utilizes a fuel having a varying energy content such as natural gas. In such case, the apparatus 28 of FIG. 1 would be a spark plug rather than a fuel injector. In terms of the stored energy content value ($E_G$), it is recognized that such value could be an energy per unit mass such as (J/g) or such value could be an energy per unit volume such as (J/m$^3$). It is also anticipated that steps in accordance with the present invention could be incorporated into the processing means of ECM 40 using a variety of known programming techniques.

Other aspects, objects and advantages of the present invention can be obtained from a study of the drawings, the disclosure and the appended claims.

We claim:

1. A method for dynamically adjusting a fuel control system of an internal combustion engine (12) during engine operation to account for variations in the energy content of a fuel delivered to the engine, the fuel control system utilizing a stored fuel energy content value ($E_G$) to determine the necessary duration of a fuel admission valve control signal, the method comprising the steps of:

(a) sensing engine speed;

(b) determining engine load;

(c) determining an expected exhaust $O_2$ level as a function of said engine speed and said engine load;

(d) sensing an actual engine exhaust gas $O_2$ level;

(e) comparing the exhaust gas $O_2$ level sensed in step (d) with the expected exhaust gas $O_2$ level; and (f) adjusting the stored fuel energy content value ($E_G$) based upon the comparison made in step (e).

2. The method, as set forth in claim 1, wherein the fuel delivered to the engine is a gaseous fuel.

3. The method, as set forth in claim 1, wherein:

step (e) includes determining a difference between the actual exhaust gas $O_2$ level and the expected exhaust gas $O_2$ level; and step (f) is only performed when the absolute value of the difference exceeds a threshold difference.

4. The method, as set forth in claim 3, wherein steps (d), (e) and (f) are repeated until the absolute value of the difference no longer exceeds the threshold difference.

5. The method, as set forth in claim 3, wherein:

step (f) includes adjusting the stored fuel energy content value ($E_G$) by an amount which is a function of the difference.

6. The method, as set forth in claim 3, wherein:

step (f) includes adjusting the stored fuel energy content value ($E_G$) by a predetermined amount.

7. The method, as set forth in claim 1, wherein:

step (e) includes determining a difference between the actual exhaust gas $O_2$ level and the expected exhaust gas $O_2$ level; and step (f) includes adjusting the stored fuel energy content value ($E_G$) by an amount which is a function of the difference.

8. The method, as set forth in claim 7, wherein:

in step (f) a PID controller (72) is utilized to determined an updated fuel energy content value ($E_G'$), and the stored fuel energy content value ($E_G$) is replaced with the updated fuel energy content value ($E_G'$).

9. The method, as set forth in claim 1, wherein:

step (f) includes decreasing the stored fuel energy content value ($E_G$) if the actual exhaust gas $O_2$ level is greater than the expected exhaust gas $O_2$ level.

10. The method, as set forth in claim 9, wherein:

step (f) includes increasing the stored fuel energy content value ($E_G$) if the actual exhaust gas $O_2$ level is less than the expected exhaust gas $O_2$ level.

11. The method, as set forth in claim 1, wherein the engine is a dual fuel engine capable of operating in both a liquid fuel mode and a gaseous fuel mode, the fuel control system utilizing the stored fuel energy content value ($E_G$) during engine operation in the dual fuel mode.

* * * * *